May 27, 1958
A. FREY ET AL
2,836,778
APPARATUS FOR CONVERTING ELECTRICAL ENERGY
INTO MECHANICAL ENERGY
Filed Nov. 17, 1955
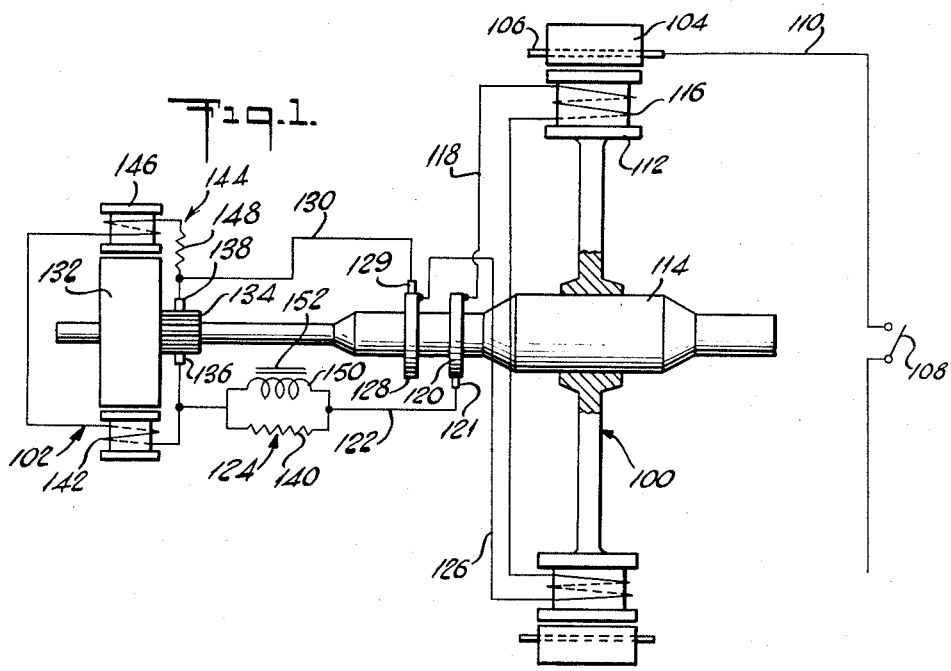
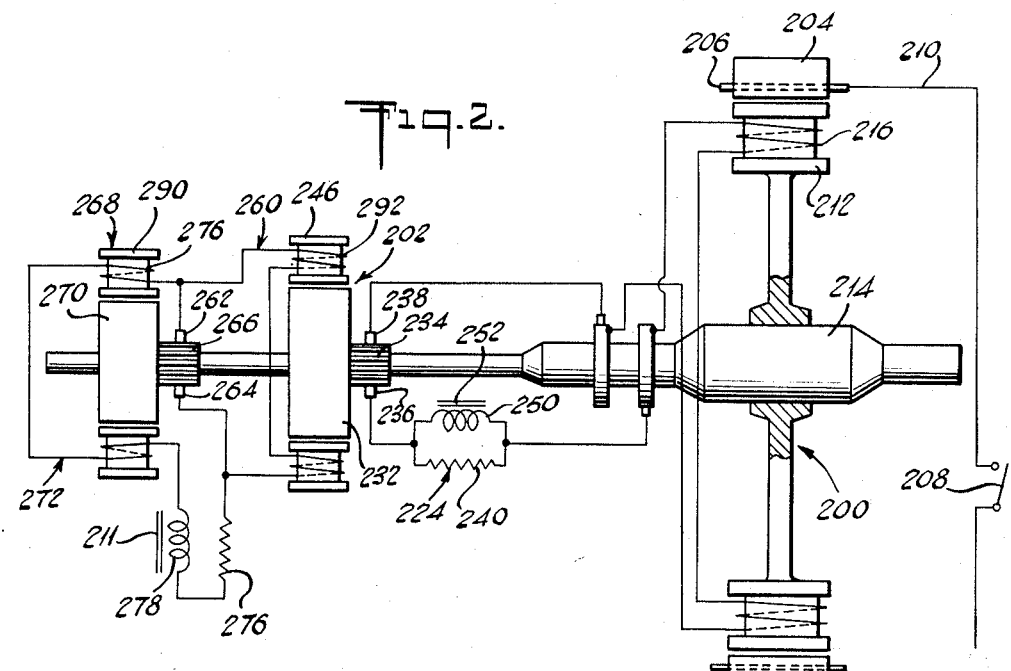
INVENTORS
ALFRED FREY
KURT PESCHEL
BY
ATTORNEY

United States Patent Office 2,836,778
Patented May 27, 1958

2,836,778

APPARATUS FOR CONVERTING ELECTRICAL ENERGY INTO MECHANICAL ENERGY

Alfred Frey, Stuttgart, and Kurt Peschel, Halle (Saale), Germany, assignors to VEB Leuna-Werke "Walter Ulbricht," Leuna, Germany Application November 17, 1955, Serial No. 547,580

2 Claims. (Cl. 318—190)

The present invention relates to an electrical apparatus, and more particularly to an apparatus comprising a synchronous motor and at least one exciter.

It is an object of the present invention to avoid the disadvantages inherent to the aggregates known in the art which include a resistor which may be short-circuited by a shunting switch being under the influence of a time relay. These parts require a relatively large space and are liable to faults in the operation thereof.

It is another object of the invention to simplify the switching elements connected with the exciter.

It is a further object of the present invention to simplify the servicing and starting of the apparatus so that the synchronous motor becomes with respect to the servicing and/or starting thereof comparable to an asynchronous motor.

Other objects and advantages of the present invention will be apparent from the following detailed description thereof in connection with the accompanying drawing showing, by way of example, two embodiments of the present invention. In the drawings Fig. 1 is a diagrammatic plan view of a first embodiment of the present invention, and Fig. 2 is a diagrammatic plan view of a second embodiment of the present invention.

Referring now to the drawings and first to Fig. 1, an electrical apparatus is shown comprising a synchronous motor generally denoted by 100 and an exciter generally denoted by 102. The synchronous motor is preferably a large power machine and includes a stator 104 carrying an A. C. winding 106, preferably a three phase winding which is supplied with three phase current by a three phase line 110 including a three phase power switch 108. The rotor 112 of the synchronous motor 100 is rigidly connected with a shaft 114 and carries a field winding 116 having one end 118 thereof connected by a first collector ring 120 arranged on the shaft 114 with a sliding contact 121 connected to a conductor 122 including a parallel connection generally denoted by 124 and including a starting resistor 140 and a choke coil or reactor 150 having an iron core 152. The other end 126 of the field winding 116 is connected by a second collector ring 128 arranged on the shaft 114, with a sliding contact 129 connected to a second conductor 130.

The exciter 102 is designed as a D. C. generator including a rotor 132 directly placed on the shaft 114. However, it should be understood that in case the shaft 114 of the synchronous motor 100 carries out a relatively low number of revolutions per min. the rotor 132 of the exciter 102 may be driven by a step up gear (not shown) transmitting the rotation of the slowly rotating shaft 114 of the synchronous motor 100 to the rotor 132 of the exciter 102. The rotor of the exciter 102 is connected with a commutator 134 being in sliding contact with two brushes 136, 138 connected, respectively, to the conductors 122, 130.

The stator 146 of the exciter 102 carries a winding 142 forming a self excitation circuit generally denoted by 144 and including a resistor 148 having a negative current-voltage characteristic.

The operation of this apparatus is as follows:

In order to start the synchronous motor 100 the three phase power switch 108 is closed so that the stator winding 106 of the synchronous motor 100 is energized. Thereby an alternating current is induced in the field winding 116 supported by the rotor 112 of the synchronous motor 100 which is at first stationary. The current flows through the closed circuit including the resistor 140, the reactor 150, and the winding 142 forming part of the self excitation circuit 144. This current is strongly limited by the parallel connection 124 including the starting resistor 140 and the reactor 150 having an iron core 152. Initially the iron core 152 of the reactor 150 is unsaturated so that its resistance is relatively high, and the current flows through the starting resistor 140 so as to be maintained by the same at a relatively low value. The rotor 132 of the exciter 102 starts to rotate slowly owing to its connection with the rotor 112 of the large synchronous motor 100, and the direct current produced by the armature 132 and the commutator 134 of the exciter 102 passes without hindrance through the brushes 136, 138 to the rotor field winding 116 of the synchronous motor 100. The period of excitation is relatively long so that the full exciting current is reached only when the rotor 112 of the synchronous motor 100 rotates safely at full speed. Thus it will be seen that the synchronization is achieved only after the exciting current has reached a sufficient amperage.

In order to increase the period of self-excitation of the exciter 102 as far as possible preferably the resistor 148 having a negative current-voltage characteristic is provided in the excitation circuit 144.

The rotor 132 of the exciter 102 is preferably directly driven by the shaft 114 of the synchronous motor 100 so as to achieve with safety that the period of excitation of the apparatus adapts itself to the period of time in which the rotor 112 of the synchronous motor 100 attains its full speed. In other words, as long as the synchronous motor 100 has not attained its full number of revolutions per unit time the voltage supplied by the exciter 102 is maintained positively at a low value since the number of revolutions per unit time of the exciter 102 increases only slowly. However, if desired, the rotor 132 of the exciter 102 may be driven by the step-up gear (not shown) mentioned hereinabove, in case the rotor 112 of the synchronous motor 100 and the shaft 114 rigidly connected therewith rotate at too low a speed.

In Fig. 2 of the drawings, an arrangement is shown in which the alternating or three phase current induced in the field winding of the synchronous motor, during the starting period of the same, does not influence the exciting winding of the exciter.

Referring now to Fig. 2 in detail, the synchronous motor generally denoted by 200 has a stator 204 having a winding 206 fed with alternating or three phase current from the line 210 switched in by a three phase power switch 208. The rotor 212 of the synchronous motor 200 is mechanically connected with the shaft 214 thereof and carries a field winding 216 the circuit of which is closed over the parallel connection 224 including a starting resistor 240 and a choke coil or reactor 250 provided with an iron core 252, the commutator 234, and the winding (not shown) of the rotor 232 of a first D. C. generator of main exciter 202. The parts so far described operate substantially in the same manner as the corresponding parts shown in Fig. 1.

However, the stator 246 of the main exciter 202 carries a winding 242 connected in a circuit generally denoted by 260 which is entirely separated from the brushes 236 and 238 connected with the commutator 234 of the main exciter 202. Instead the circuit 260 includes two brushes 262, 264 sliding on the commutator 266 of a second D. C. generator or pilot exciter generally denoted by 268. The commutator 266 is arranged on the shaft 214 which supports also the rotor 270 of the pilot exciter 268. Parallel to the circuit 260 a circuit generally denoted by 272 is arranged, the circuit 272 including an self-excitation winding 274 arranged on the stator 290 of the pilot exciter, and a series connection of a resistor 276 having a negative current voltage characteristic, and a reactor 278 having an iron core 211.

In operation the exciting current flowing through the exciting winding 242 of the main exciter 202 is supplied by the rotor 270 of the pilot exciter 268, the rotor 270 being connected in parallel to the electric circuit 272 including the stator winding 274 and the series connection of the reactor 278 and the resistor 276 having a negative current voltage characteristic.

We have described in detail hereinabove preferred embodiments of an electrical apparatus comprising a synchronous motor and at least one exciter. However, we wish it to be understood that numerous changes, and substitutions of equivalents may be made in the apparatus described in detail hereinabove without departing from the gist and spirit of our invention.

We claim:

1. In an apparatus for converting electrical energy into mechanical energy, including a synchronous motor having a stator and a rotor, an A. C. winding arranged on said stator, a field winding arranged on said rotor, a shaft connected with said rotor, a D. C. generator having a rotor driven by said shaft, excitation circuit means interconnecting the output of said generator with said field winding, and a parallel connection including a starting resistor and a reactor coil having an iron core connected in series in said excitation circuit means; an improvement for exciting said D. C. generator, said improvement comprising self excitation circuit means for exciting said D. C. generator, and a resistor having a negative current-voltage characteristic connected in series in said self excitation circuit means.

2. In an apparatus for converting electrical energy into mechanical energy, including a synchronous motor having a stator and a rotor, an A. C. winding arranged on said stator, a field winding arranged on said rotor, a shaft connected with said rotor, a D. C. generator having a rotor driven by said shaft, excitation circuit means interconnecting the output of said generator with said field winding, and a parallel connection including a starting resistor and a reactor coil having an iron core connected in series in said excitation circuit means; an improvement for exciting said D. C. generator, said improvement comprising a stator forming part of said D. C. generator, an exciting winding arranged on said stator of said D. C. generator, circuit means for self excitation of said exciting winding and a resistor having a negative current-voltage characteristic connected in series in said self excitation circuit means.

References Cited in the file of this patent

UNITED STATES PATENTS

| | | |
|---|---|---|
| 694,092 | Danielson | Feb. 25, 1902 |
| 1,485,006 | Yamamoto | Feb. 26, 1924 |
| 1,524,496 | Yamamoto et al. | Jan. 27, 1925 |
| 1,570,109 | Weichsel | Jan. 19, 1926 |
| 1,788,247 | Nickle | Jan. 6, 1931 |
| 1,944,741 | Inman | Jan. 23, 1934 |
| 2,298,134 | Kilgore | Oct. 6, 1942 |